Patented June 25, 1935

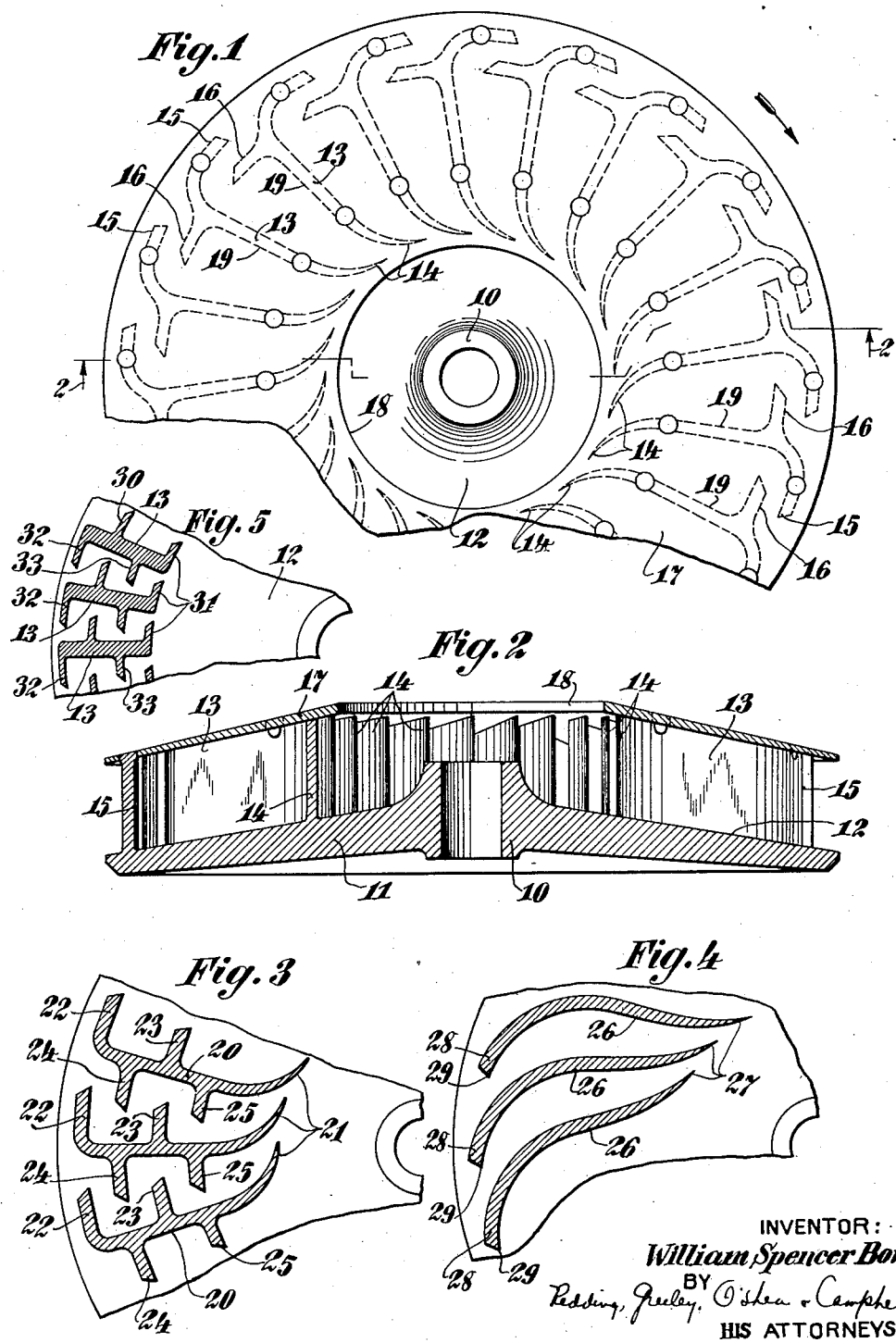

2,005,987

UNITED STATES PATENT OFFICE 2,005,987

MICRONIZER HEAD

William Spencer Bowen, Westfield, N. J.

Application December 9, 1933, Serial No. 701,594

3 Claims. (Cl. 299—63)

The present invention relates to micronizing apparatus and embodies, more specifically, an improved head by means of which a substance may be sprayed or atomized far more effectively and simply than in existing constructions. In accordance with the present invention, it is proposed to provide an apparatus and method by means of which the particles of a fluid may be directed outwardly and radially from a central axis and, under enormous centrifugal force, pass over an edge which has a shearing effect upon the particles to break the particles down and cause fine atomization or homogenization thereof. It is further proposed, in the method and apparatus above referred to, to subject the outwardly moving particles to impact, the disrupting effect of which further divides and atomizes the substance.

The invention further proposes to provide a method and apparatus for homogenizing and emulsifying substances introduced thereinto by directing the same outwardly under enormous centrifugal force and subjecting the particles of the substance to successive impact and shearing stages by means of which the homogenization and emulsification thereof is brought about effectively.

The present application is closely related to the structure set forth in applicant's copending application Ser. No. 697,086 filed November 7, 1933, and sets forth further structure and methods by means of which homogenization and emulsification of substances is effected.

Referring to the accompanying drawing, the invention will be illustrated as embodied in several types of mechanisms, the structure shown in Figure 1 being one form of the invention, as shown in plan view, with the homogenizing blades indicated in dotted lines.

Figure 2 is a view in section, taken on line 2—2 of Figure 1, and looking in the direction of the arrows.

Figure 3 is a partial horizontal view in section showing a modified form of micronizer with blades constructed in accordance with the present invention.

Figure 4 is a further modification of the invention, this view being similar to Figure 3.

Figure 5 is a segmental view showing another and preferred form of the invention.

With reference to Figures 1 and 2, a micronizer head is shown as being formed with a hub portion 10 to which a dispersing and supporting disc 11 is appended. The dispersing surface 12 of the disc 11 may slope downwardly and outwardly away from the axis of the hub 10. It is to be understood that the sloping of this surface is not a necessary feature of the construction, as many forms of surfaces may be utilized. This surface supports a plurality of blades 13, the inner edges 14 of which are spaced adjacent the hub 10 and the outer edges 15 of which are positioned adjacent the periphery of the disc 11. The outer portions 15 of the blades preferably extend in a direction which is the direction of rotation of the head, as indicated by the arrow in Figure 1. It will be observed that the edge of the outer portion 15 lies in back of the radial line passing through the edge of the inner portion 14 of each blade.

Upon each blade, and adjacent the outer portion 15 thereof is a backwardly extending fin 16 which preferably lies within the outer portion 15 of the adjacent blade, as clearly shown in Figure 1. The fins 16 extend in a reverse direction from the outer portions of the blades 15 and preferably lie in planes which are substantially at right angles to the planes of the blades 13. The edges of the fins 16 and outer portions 15 are preferably formed by surfaces lying in planes forming acute angles in order that a more effective shearing force may be exerted upon particles passing thereover. A cover 17 is secured to the tops of the blades 13 and provided with a central aperture 18 through which substance may be introduced into the head. The back walls 19 of the blades 13 curve in the manner indicated in Figure 1, and function as described hereinafter.

In operation, the head 10 is rotated at a high rate of speed and a substance is directed through the aperture 18 in the cover 17. The substance falls upon the dispersing surface 12 and has a great centrifugal force imparted thereto. As the substance flies outwardly, it strikes against the inner edges 14 of the blades 13 and moves along the back walls 19 of the said blades. The impact of the substance against the blades has a substantial disrupting and homogenizing effect thereon and, as the substance is forced over the surface 19 of the blades, a shearing action is set up tending to further homogenize the same. This action also produces effective emulsifying action. The substance then strikes the adjacent surface of the fins 16 and thus is subjected to further impact following which the particles are forced over the shearing edge of the fins 16 and directed against the adjacent inner edge of the outer portions 15 of the blades. This action produces a further shearing and impact and is followed by a subsequent shearing stage during which the particles are forced over the shearing edge of the outer portion 15 of the blades.

From the foregoing, it will be seen that the provision of a surface or surfaces substantially at right angles to the blades or to radii of the head affords a means for subjecting the particles to impact, as well as the shearing stresses during the movement of the particles over the shearing edges of such portions. The centrifugal force imparted to the particles by the high speed rotation of the head is so great as to cause the particles to be directed outwardly and to strike with great impact any surface lying in its radial path. The resulting action serves to emulsify and homogenize effectively the substance introduced into the mechanism.

In the construction shown in Figure 3, backward leading vanes 20 are provided with forward leading inner portions 21 and forward leading flanges 22 and 23. Rearward leading flanges 24 and 25 are formed upon the backs of the vanes and each of the flanges is formed with shearing edges by means of which the shearing action upon the particles is greatly increased. The elements of this form of the invention function similarly to the functioning of the corresponding elements of the construction shown in Figure 1 and this form of the invention will therefore be seen to provide a plurality of impact and shearing stages to which the particles of the substance are subjected.

In the construction shown in Figure 4, backward leading vanes 26 are formed with surfaces having a compound curve, the inner extremities 28 thereof curving rearwardly. The edges 29 of the outer extremities are formed sufficiently sharp to exert a shearing action upon the substance and in the high speed rotation of the wheel, the particles are deflected outwardly and strike the inner extremities 27 under great impact. The particles are then scrubbed or forced along the rear edges of the vanes to exert what might be considered a combined shearing and impact effect thereon and subsequently engage the shearing edge 29 over which they are forced under great pressure. The functioning of this wheel will be seen to be similar to the constructions previously described herein and further details of the operation thereof are therefore deemed unnecessary at this point.

In the construction shown in Figure 5, the blades 13 are substantially radial and are provided with forward leading fins 30 and 31 and backward leading fins 32 and 33. The forward leading fins overlap with the backward leading fins of adjacent blades and thus produce a baffling action on the particles which are under centrifugal force. The forward leading fin 31 serves as a substantially perpendicular surface against which the particles engage under impact stresses and following such initial impact the particles cascade from fin to fin in their outward motion producing alternate shearing and impact stresses upon the particles.

From the foregoing, it will be seen that the present invention embodies an improved method and apparatus for homogenizing and emulsifying material which is introduced into the spray wheel or head. The method of homogenization and emulsification consists in subjecting to the material or substance a high centrifugal force and then subjecting the same to impact and shearing stresses. The apparatus by means of which such method may be carried out will be seen to include a rotary wheel or head which is adapted to be rotated at high speeds to impart great centrifugal force to the substance introduced into the wheel, the blades having surfaces lying at angles to radii of the wheel and further being provided with means to subject the particles to shearing action while the particles are still under the high centrifugal force to which they have been subjected.

The foregoing mechanism is particularly effective in homogenizing and emulsifying gases as well as all fluid bodies inasmuch as the impact and shearing stresses to which the particles are subjected in series gives far more effective dispersion of particles than in existing forms of mechanisms. The tremendous impact stresses upon the droplets of substance directed to the head produces effective and minute dispersion of the particles and is far more effective in producing a spray of particles from each droplet than in constructions wherein the particles simply slide over angular surfaces.

While the invention has been described with specific reference to the accompanying drawing, it is not to be limited, save as defined in the appended claims.

I claim as my invention:

1. Homogenizing means comprising a rotatable head having a blade formed with a surface lying in a plane parallel with the axis of the head to impart centrifugal force to a substance, means on the blade forming a surface at substantially right angles to the blade against which the substance is directed under centrifugal force, said means being provided with a cutting edge parallel to the axis of the head to exert a shearing force upon the particles of the substance as it is directed thereover under centrifugal force, and means substantially parallel to the last named means against which the substance is directed under centrifugal force from the said edge, the last named means being provided with a cutting edge parallel to the axis of the head to exert a shearing action on the particles of the substance.

2. Homogenizing means comprising a rotatable head having a dispersing surface, blades on the head lying in planes parallel to the axis of the head, flanges on the blades in overlapping relation and substantially perpendicular to radii of the head, and shearing edges on the flanges parallel to the axis of the head.

3. Homogenizing means comprising a rotatable head, a plurality of series of circularly spaced members lying in planes parallel to the axis of the head and perpendicular to radii thereof, one of the series of the members being differently spaced radially of the head from another of the series, and the members of one series being offset with respect to the members of an adjacent series, the edges of the members being formed as cutting edges to subject particles of a substance to shearing stresses under centrifugal force.

WILLIAM SPENCER BOWEN.